(12) United States Patent
Ranney et al.

(10) Patent No.: US 11,604,271 B2
(45) Date of Patent: Mar. 14, 2023

(54) METHOD AND APPARATUS FOR PERFORMING DUAL POLARIZATION CHANGE DETECTION USING POLARIMETRIC SYNTHETIC APERTURE RADAR IMAGERY

(71) Applicant: U.S. Army Combat Capabilities Development Command, Army Research Laboratory, Adelphi, MD (US)

(72) Inventors: Kenneth I. Ranney, Monrovia, MD (US); David C. Wong, Clarksville, MD (US); Tuan That Ton, Springfield, VA (US); Brian R. Phelan, Silver Spring, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 226 days.

(21) Appl. No.: 16/903,510

(22) Filed: Jun. 17, 2020

(65) Prior Publication Data
US 2021/0396868 A1    Dec. 23, 2021

(51) Int. Cl.
*G01S 13/90* (2006.01)
*G01S 13/88* (2006.01)
*G01S 7/292* (2006.01)

(52) U.S. Cl.
CPC .......... *G01S 13/887* (2013.01); *G01S 7/2926* (2013.01); *G01S 13/9027* (2019.05); *G01S 13/9076* (2019.05)

(58) Field of Classification Search
CPC .... G01S 13/90; G01S 13/887; G01S 13/9025; G01S 13/9076; G01S 7/2926
See application file for complete search history.

(56) References Cited

U.S. PATENT DOCUMENTS

| | | | |
|---|---|---|---|
| 9,885,784 B2 | 2/2018 | Ranney et al. | |
| 10,436,897 B2 | 10/2019 | Ranney et al. | |
| 2009/0179790 A1* | 7/2009 | Jahangir | G01S 15/8904 342/25 B |
| 2018/0003815 A1* | 1/2018 | Ranney | G01S 13/90 |
| 2018/0052229 A1* | 2/2018 | Ranney | G01S 13/885 |

OTHER PUBLICATIONS

Novak et al.,"Performance of a High-Resolution Polarimetric SAR Automatic Target Recognition System", The Lincoln Laboratory Journal, vol. 6, No. 1, 1993.
Soumekh,"Signal Subspace Fusion of Uncalibrated Sensors with Application in SAR and Diagnostic Medicine", IEEE Transactions on Image Processing, vol. 8, No. 1, Jan. 1999.
(Continued)

*Primary Examiner* — Timothy A Brainard
(74) *Attorney, Agent, or Firm* — Eric B. Compton

(57) ABSTRACT

Apparatus and method configured to determine locations of man-made objects within synthetic aperture radar (SAR) imagery. The apparatus and method prescreen SAR imagery to identify potential locations of man-made objects within SAR imagery. The potential locations are processed using a change detector to remove locations of natural objects to produce a target image containing location of substantially only man-made objects.

16 Claims, 7 Drawing Sheets

(56) References Cited

OTHER PUBLICATIONS

Ranney et al."Signal Subspace Change Detection in Averaged Multilook SAR Imagery", IEEE Transactions on Geoscience and Remote Sensing, vol. 44, No. 1, Jan. 2006.

Ranney et al. ,"Hyperspectral Anomaly Detection Within the Signal Subspace", IEEE Geoscience and Remote Sensing Letters, vol. 3, No. 3, Jul. 2006.

Paglieroni et al.,"Change Detection in Constellations of Buried Objects Extracted From Ground-Penetialing Radar Data", IEEE Transactions on Geoscience and Remote Sensing, vol. 53, No. 5, May 2015.

Novak, "Change Detection for Multi-Polarization, Multi-Pass SAR", Algorithms for Synthetic Aperture Radar Imagery XII, Proceedings of SPIE vol. 5808, 0277-786X/05/$15, May 19, 2005.

Ranney, Declaration of Kenneth I. Ranney regarding the 2019 MSS Tri-Service Radar Symposium (TSRS) and ARL-TN-0979, both limited access. (Declaration dated Jun. 17, 2020).

\* cited by examiner

METHOD AND APPARATUS FOR PERFORMING DUAL POLARIZATION CHANGE DETECTION USING POLARIMETRIC SYNTHETIC APERTURE RADAR IMAGERY

GOVERNMENT INTEREST

The invention described herein may be manufactured, used and licensed by or for the U.S. Government.

BACKGROUND

Field

Embodiments of the present invention generally relate to the field of signal processing of synthetic aperture radar (SAR) imagery and, more specifically, to a method and apparatus for performing dual-polarization change detection using polarimetric synthetic aperture radar imagery.

Description of the Related Art

A previously described SAR imagery processing system of commonly assigned, U.S. Pat. No. 9,885,784, granted Feb. 6, 2018, and U.S. Pat. No. 10,436,897, granted Oct. 8, 2019, both of which are hereby incorporated herein by reference in their entireties, utilize a polarimetric man-made object detector (PMOD) to detect man-made objects based on the left-right symmetry of man-made objects. The system uses a combination of cross-polarized (cross-pol) and co-polarized (co-pol) signals to detect the left-right symmetry of objects within an imaged scene. In short, a man-made object results in a measurement of a cross-pol signal minimum and a co-pol signal maximum at the center of the object. This dual-pol signature characteristic constitutes a basis for the polarimetric man-made object detector (PMOD). However, in nature, there are objects that exhibit left-right symmetry (e.g., cacti) and cause the PMOD to produce false positive detections of natural objects as man-made objects.

Therefore, there is a need for a method and apparatus for reducing false positives in a PMOD when analyzing polarimetric SAR imagery.

SUMMARY

Embodiments of the present invention include a method and apparatus configured to determine locations of man-made objects within synthetic aperture radar (SAR) imagery. Embodiments prescreen SAR imagery to identify potential locations of man-made objects within SAR imagery. The potential locations are processed using a change detector to remove locations of natural objects to produce a target image containing location of substantially only man-made objects.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the invention may utilize a polarimetric SAR image processor as described in U.S. Pat. No. 10,436,897, granted Oct. 8, 2019, and hereby incorporated herein in its entirety (referred to herein as the '897 patent), as one exemplary image processor, to produce a pair of images—a test image and a reference image of a scene.

The reference and test images are taken of the same scene, but temporally displaced. The images could be separated in time by several hours to several days, for instance. The reference image of the scene may be produced when no man-made objects are present (or presumed present) in the field of view of the radar and the test image is created later using radar when man-made objects (targets) are present or may be present in the scene previously forming the reference image. This establishes (or implies) incoming man-man objects or targets had entered the scene, which are captured in the test image. The opposite scenario may be also occurred, that is, the reference image includes (or is presumed to include) made-man objects and the test image does not. This establishes (or implies) outgoing man-made objects or targets had left the scene, which had been captured in the reference image.

Ideally, the reference and test images should be taken at the same or nearly the same vantage or viewpoint. If necessary, all imagery should be spatially aligned. That is, the pixel coordinates in each image should correspond to (very nearly) the same location. As such, one or both of the two types of images may need to be re-adjusted, rescaled and/or resized so that they capture the same scene in their field-of-view and at the same perspective. Such image processing techniques exist and will not be further discussed herein.

Embodiments of the invention perform a dual-pol prescreen process on the test and reference images to determine locations of symmetric objects therein, and to produce prescreened test and reference images, each including pixels comprising output statistics calculated by the dual-pol prescreen process, as well as a target detection list (i.e., locations of suspected targets in the prescreened test image). Thereafter, the prescreened images and the detection list are further processed using change detection techniques to identify and remove presumed false alarm objects from the detection list. In this manner, a final, target image is created having fewer false alarms (ideally, no false alarms will appear in the final, target image). Using change detection techniques facilitates accurate detection of man-made objects as well as when such objects are removed or added to a scene.

Figure 1:
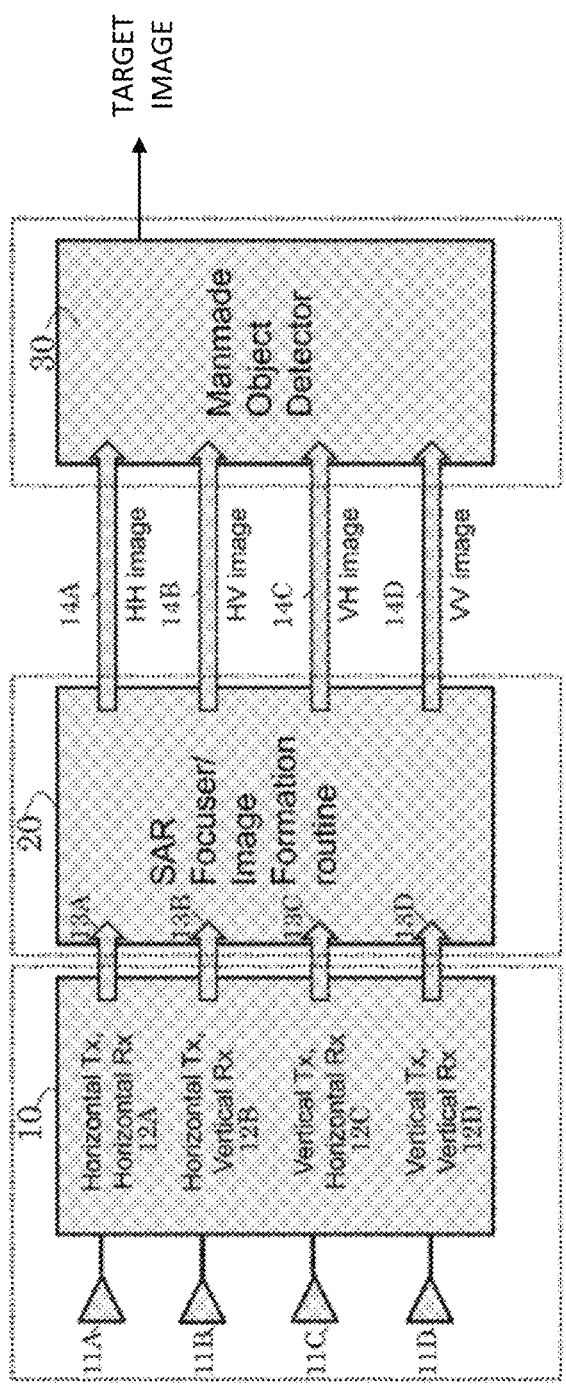
FIG. 1 depicts a schematic block diagram of a polarimetric SAR image processing system in accordance with an embodiment of the invention.

FIG. 1 is a schematic block diagram of a preferred embodiment polarimetric manmade object detection system. In one embodiment, a SAR sensor produces imagery having sufficient down-range and cross-range resolution to ensure that one image pixel encompasses a target's point of left/right symmetry without including contributions from non-target objects adjacent the target.

The SAR images—collected simultaneously at different polarizations—contain information regarding the polarization state of the target. An embodiment enhances target signatures by combining of co-polarimetric (VV and HH) and cross-polarimetric (HV and VH) radar data using co-polarimetric and cross-polarimetric radar images. Note that VV is transmit vertical polarization, receive vertical polarization; HH is transmit horizontal polarization, receive horizontal polarization; HV is transmit horizontal polarization, receive vertical polarization; VH is transmit vertical polarization, receive horizontal polarization.

The polarimetric SAR receiver 10 comprises four input/output receiver/transmitters or "basis" channels 11A to 11D for inputting data into SAR receiver sections 12A through 12D through to the SAR processor 20. The data may be fully polarimetric and includes (A) horizontal antenna transmitted data which was received by a horizontal receiver antenna data (shown as horizontal Tx horizontal Rx in FIG. 1) transmitted and received at 11A, (B) horizontal antenna transmitted data which was received by a vertical receiver antenna data (shown as horizontal Tx vertical Rx in FIG. 1) transmitted and received at 11B, (C) vertical antenna transmitted data which was received by a horizontal receiver antenna data (shown as vertical Tx, horizontal Rx in FIG. 1) transmitted and received at 11C and (D) vertical antenna transmitted data which was received by a vertical receiver antenna data (shown as vertical Tx, vertical Rx in FIG. 1) transmitted and received at 11D.

The SAR sensor produces imagery of high enough down-range and cross-range resolution to ensure that one image pixel encompasses the target's point of left/right symmetry without including contributions from non-target objects adjacent to the target. The synthetic aperture radar images—collected simultaneously at different polarizations (A-D) contain information regarding the polarization state. Reference is made to the radar system shown in FIGS. 9-15 of the aforementioned '897 patent as one example of a system that can produce these images. The novel processing disclosed in embodiments of the present invention herein uses at least one co-pol channel (VV or HH) and one cross-pol (VH or HV). It is noted that these are also inputs 11C and 11D in FIG. 1 of the '897 patent.

The inputted data is focused to produce four co-registered SAR images of a common scene, wherein a specified pixel value represents the radar cross section (RCS) of the same scene in each of the four basis polarizations. The four images are then inputted through channels 14A-14D to the polarimetric manmade object detector 30, which produces an output image containing the identified man-made targets.

Embodiments of the invention produce four co-registered SAR images twice—once to produce a reference image in which targets are not present and once to produce a test image from which targets are to be detected. However, the target identification process does not use all four images since the two co-pol images have the same information and the two cross-pol images have similar information (in terms of the polarimetric man-made object detector (PMOD) requirements). As such, the processing in the PMOD 30 uses one co-pol image and one cross pol-image for processing.

As is described in detail below, an embodiment of the multi-polarization, multi-feature, prescreener-based (MPMFPS) change detector uses change detection processing on the co-registered SAR test and reference images to detect man-made objects within the test image, i.e., objects displaying left-right symmetry such as, among other things, spheres, ellipsoids and trihedrals.

The change detection paradigm applies a subspace-based processor only at image pixels that exceed a pre-determined prescreener threshold in the test image. The use of a subspace-based processor is due to the nature of the MFPS output image, in which both target and clutter responses occupy very few pixels. That is, the maximum prescreener output of the same false object in one pass of the radar could be offset slightly from its maximum prescreener output in a different pass, and these variations might not be consistent across the scene. The subspace projection incorporates a "target template" rather than actual data from the test image. The target template simply performs a moving average across a region of the background (reference) image centered at the pixel under test (PUT), and the maximum value of this spatial average represents the "best" match between the reference and target regions. This value is then used to normalize the pixel under test to obtain the final change detection output. This technique finds the most likely target location within the reference region and normalizes the PUT by the average power within that hypothesized target region. If there is a similar target within each region (reference and test), the resulting ratio will be close to 1.

Figure 2:
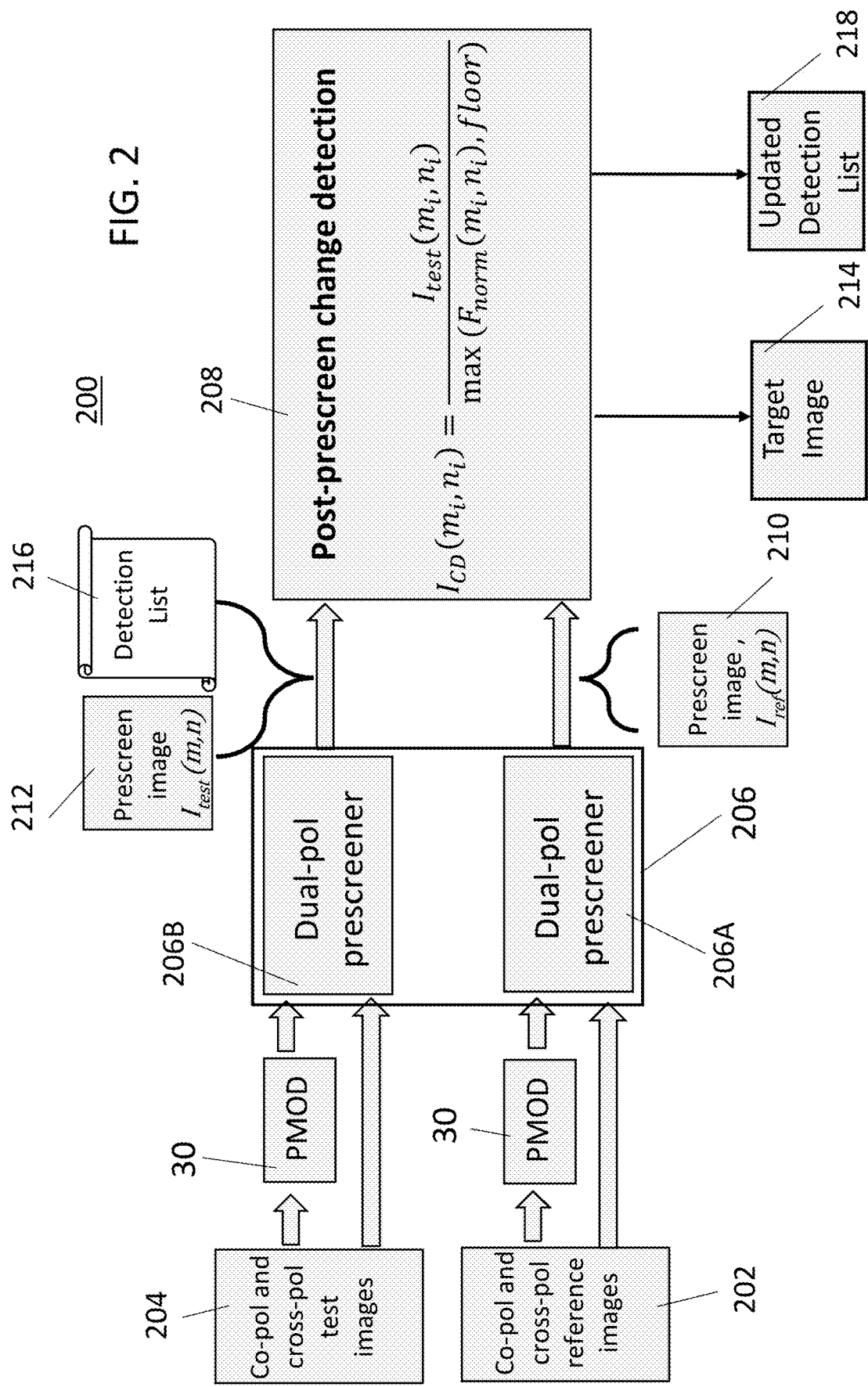
FIG. 2 depicts a flow diagram of processing that is performed by a multi-polarization, multi-feature prescreener-based (MPMFPS) change detector in accordance with an embodiment of the invention.
Figure 7:
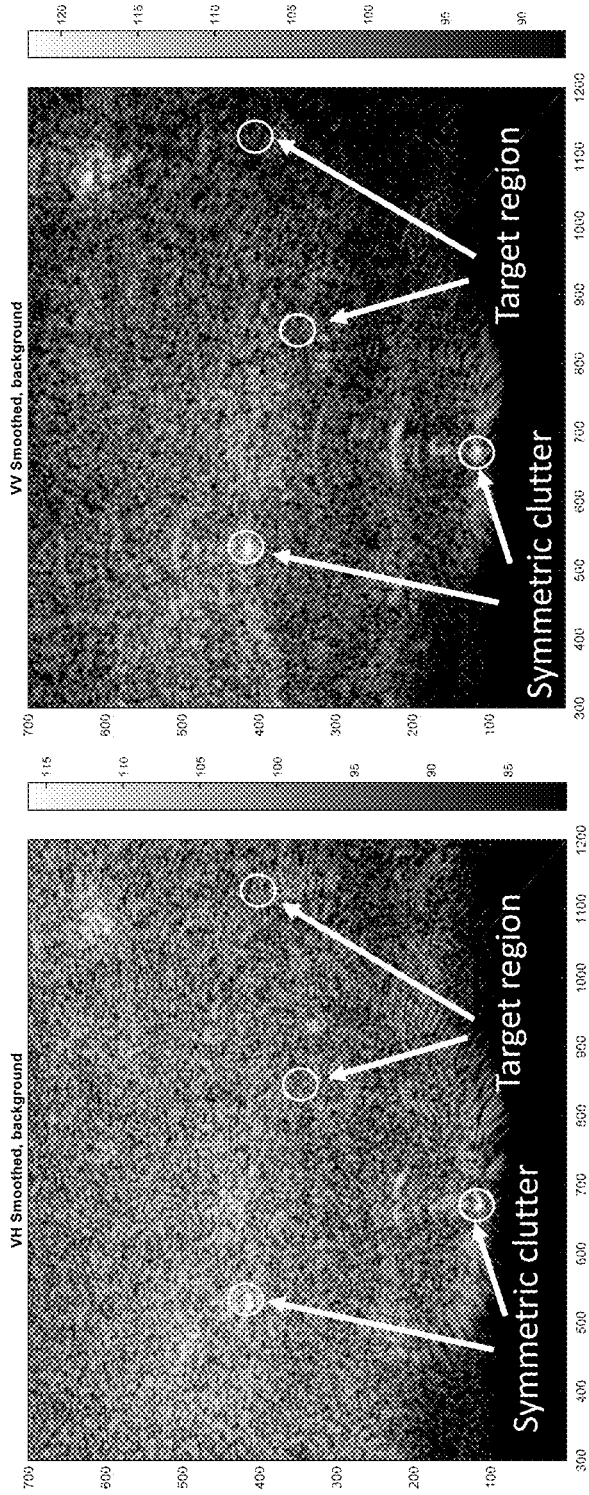
FIG. 7 depicts an example of a reference image comprising first co-pol and a first cross-pol images.
Figure 8:
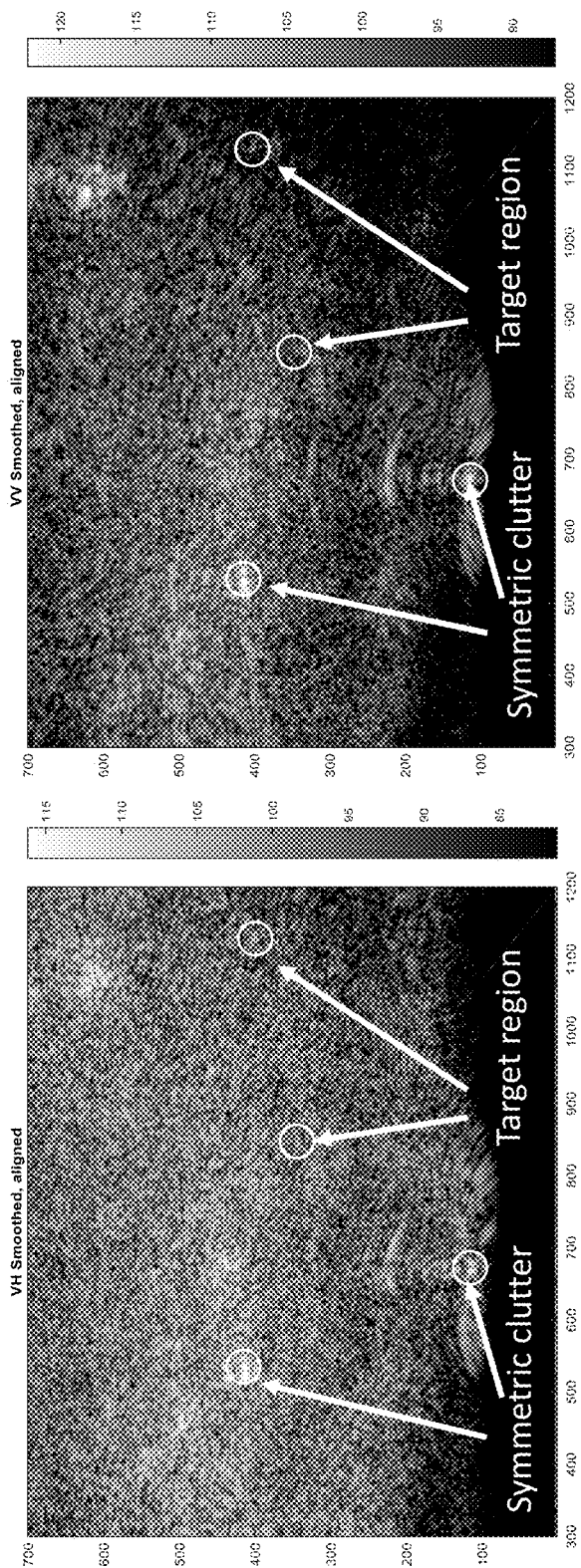
FIG. 8 depicts an example of a test image comprising second co-pol and second cross-pol images.

FIG. 2 depicts a block diagram of a MPMFPS change detection processor 200 incorporating PMOD 30 of FIG. 1 in accordance with an embodiment of the invention. The reference image 202 comprises a first co-pol SAR image and a first cross-pol SAR image of a scene captured at a first time, while the test image 204 comprises a second co-pol SAR image and a second cross-pol SAR image of the same scene captured at a second time. Examples of first co-pol and first cross-pol images (i.e., a reference image) are depicted in FIG. 7, and examples of second co-pol and second cross-pol images (i.e., a test image) are depicted in FIG. 8. The locations of both emplaced targets and symmetric clutter, e.g., cylindrical cacti, are indicated in the images. Although examples of the invention herein process a reference image that does not contain man-made objects and a test image containing man-made objects (i.e., added objects), embodiments are also useful in processing a reference image that does contains man-made objects and a test image that does not contain man-made objects (i.e., removed objects), or both added and removed objects.

More specifically, FIG. 7 is a "before" picture and FIG. 8 is an "after" picture. Within each circled area where a target is located in FIG. 8 for the VH channel, there is depicted a sort of "two-pronged" target signature. Such signatures are totally absent from the "reference" image of FIG. 7. Also, at the rightmost target in the VV image of FIG. 8, a faint dot is depicted that is not present in the same location in FIG. 7. This serves to emphasize how difficult it is to detect these targets at these locations.

An embodiment of the invention comprises a dual-pol prescreener 206A and 206B (collectively, prescreener 206)

applied to each of the test and reference images 202/204 coupled to a change detector 208 that determines changes between the prescreened test image 212 and the prescreened reference image 210. The output is an image (target image 214) containing targets and having less false alarms.

The prescreening process that occurs in the dual-pol prescreeners 206A and 206B may be the same as the dual-pol, multi-feature processing that is described in the '897 patent in embodiments, see in particular, col. 8, line 17 to col. 15, line 5 describing FIGS. 2, 3A, 3B, 4, and 5A-5E.

The prescreener 206 analyzes the reference image and the test image to determine symmetric objects in the reference image and the test image. The output is an image comprising pixels with values that are largest where determined objects having left-right symmetry are located. In the present embodiment, the output of each prescreener 206A and 206B is respective prescreened reference image 210 and a prescreened test image 212 along with a detection list 216 of objects and their locations in the test image 212. The detection list is produced by applying each pixel in the test image to a threshold—pixels having values larger than the threshold are placed on the detection list. This threshold provides a measure of the local contrast. An exemplary threshold value could be 10 dB, as an example. Note that each of the prescreener components adds a certain number of dB to the final result (since the outputs of the blocks of are multiplied together). For a detailed description of this prescreener process, see FIGS. 4 and 5A and related text of the '897 patent. Each of the features consists of a ratio between the test pixel and the surrounding area. Hence, if the test cell comes from a target, and the ratio value is $r_k$ for feature k, k=1, 2, 3, then ideally $r_k \gg 1$ for all k. This means that the logarithm of these features is greater than zero. Since all features are multiplied together, we add their logarithms. Consider one example, if the ratio for one of the features is 2, we have 20*log 10(2)=6, meaning that the feature in question contributes 6 dB to the total contrast between the cell under test and its surrounding area. The individual feature values are treated as voltages rather than powers. Note that this discussion does not really affect the operation of the change detector, since (for the two most difficult clutter examples) the false alarm objects produce larger prescreener outputs than the targets. For the CD algorithm, the clutter objects that produce large outputs are somewhat consistent between passes.

As shall be described in greater detail below, the prescreened images 210 and 212 are processed in the change detector 208 to detect any changes between the images 210 and 212. Any unchanged objects in both images exhibiting large values are deemed to be false alarms (e.g., natural objects having left-right symmetry) and are removed from the detection list and the pre-screened test image 212 to produce a target image 214 containing target objects without the detected false alarms. A revised or updated detection list 218 may also be output. It would be a new, shorter detection list with all of the symmetric-clutter false alarms eliminated. Consequently, using the change detector improves the false alarm rate as compared to the output image of the '897 patent.

In one embodiment, the prescreened images 210 and 212, $I_{ref}(m,n)$ and $I_{test}(m,n)$ comprise pixels with values equal to the prescreener output at that location. The change detector 208 process produces the change detected (CD) image (target image) $I_{CD}$ on a pixel-by-pixel basis using the equation:

$$I_{CD}(m_i, n_i) = \frac{I_{test}(m_i, n_i)}{\max(F_{norm}(m_i, n_i), \text{floor})} \quad (1)$$

This equation is essentially a ratio having the numerator as the test image pixel value $I_{test}$ and the denominator is based on a filtered version of the reference image. This ratio represents the degree to which the reference image differs from the test image. A high value means that a target has entered the scene. The denominator is further calculated using the follows equations:

$F_{ref}(m_i, n_i)$ is a convolution of the reference image with a two-dimensional template (filter) performed at pixel locations defined in the detection list. This convolution represents a local spatial average over a region that is on the order of the target size, and centered around the location (m,n). $F_{ref}(m_i, n_i)$ is calculated from the reference image according to $$F_{ref}(m_i, n_i) = \Sigma_{m,n \in T} I_{ref}(m_i+m, n_i+n) \text{Template}(m,n) \quad (2)$$

where Template is a rectangular, target-sized template (filter) of constant, positive values with mean of 1 that is applied at locations contained in the detection list, and T is the set of indices corresponding to the template size and ordered such that the template is centered at location $(m_i, n_i)$ (note that the number of rows and number of columns are both odd so that the template is centered at location $(m_i, n_i)$), floor is the minimum value allowed in the denominator of the ratio of Equation (1), and $F_{norm}(m_i, n_i)$ is defined according to:

$$F_{norm}(m_i, n_i) = \frac{\max\{F_{ref}(m_k, n_k)\}}{m_k, n_k \in R}, \quad (3)$$

where R is the region over which the spatial average is evaluated. This region, R, comprises $\Delta m$ and $\Delta n$ pixels on either side of $m_i$ and $n_i$, respectively, where $\Delta m=5$ and $\Delta n=5$ are exemplary values. This procedure is repeated for all regions, R, centered at locations $(m_i, n_i)$ in the detection list 216 produced by prescreening the test image 204. Put another way, the idea is that the region, R, will be larger than the Template size T, such that the convolution of (2) can be evaluated at all pixels offset from $(m_i, n_i)$ by up to $\Delta m$ and $\Delta n$, respectively—on either side of $(m_i, n_i)$. The Template is essentially an image having pixels of a uniform intensity (i.e., shade or greyscale level or color).

The maximum value (or max) of the convolution is then compared with the floor value and the larger of the two serves as the denominator for the ratio test of Equation (1), while the prescreened test image pixel value at the same location forms the numerator of the ratio. An exemplary floor value could be the 75th percentile (i.e., 75% of all samples are smaller than that value) of all pixels in the full reference image, as an example.

The ratio calculated in Equation (1) is evaluated at each location, $(m_i, n_i)$, in the test image prescreener detection list 216. More particularly, the ratio calculated in Equation 1 will be compared with a threshold to determine how different the test image is from the reference image. The threshold may be a value 1 or possible larger. If there is no change, the ratio will be close to 1 (i.e., 0 dB), such as, for example, 2 dB. These pixel values will not be output is the final target image 214. For instance, their values will be nil (or zero). On the other hand, if there is a change (indicative that a man-made object has entered the scene), the ratio will be greater than 1. Typically, it will be much greater than 1, such as, for example, 6 dB. These pixel values will be retained and output in the final target image 214.

When thresholds are used, their values are often selected based on the distribution of the hypothesis that a target (or change) is not present. This approach attempts to limit the number of false alarms—declarations that a target (change) is present when, in fact, it is not. That is, the threshold is determined such that a constant false alarm rate (CFAR) is maintained. Consider, as a non-limiting example, if the threshold is 10 dB (20*$\log_{10}$(Threshold)=10, or Threshold=3.2), it is likely that 99.9% of the time the statistic will be less than 3.2 when a target is not present.

The aforementioned processing is iterative in nature being performed on a pixel-by-pixel basis. This can readily be achieved using a suitable programming language. For Equation (1), this could be a statement implemented within a loop. And, for Equation (2), the sum could be a statement implemented via a double loop.

Equations (1)-(3) are tailored for detection of changes due to incoming man-made objects or targets which had later entered the scene from when the reference image was taken and have been captured in the test image. To detect changes for outgoing man-made object of targets which have left the scene captured by the reference image, one could switch the roles of the reference and test images. Both scenarios may be tested so as to readily address incoming and outgoing man-made objects. The threshold values for each scenario may change but will most likely remain the same.

Figure 3:
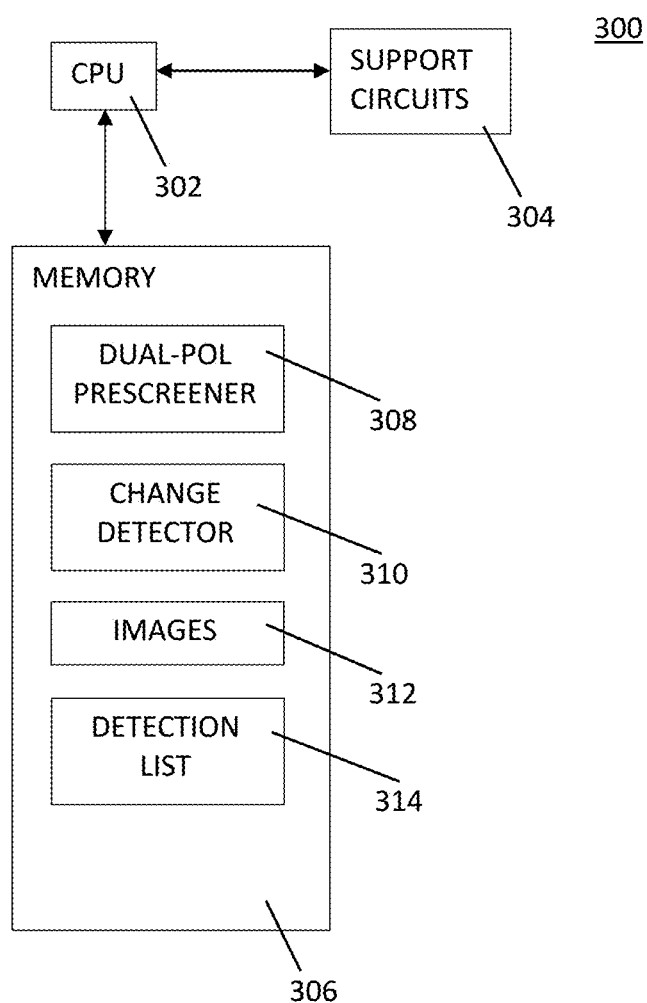
FIG. 3 depicts the MPMFPS change detector of FIG. 2 as implemented in a computer in accordance with an embodiment of the invention.

FIG. 3 depicts the MPMFPS change detector 200 of FIG. 2 as implemented in a computer 300 in accordance with an embodiment of the invention. The computer 300 comprises at least one central processing unit (CPU) 302, support circuits 304, and memory 306. The computer 300 may include one or more processors as part of CPU 302, any of which capable of performing the operations described herein. For example, the CPU 302 may comprise one or more microprocessors, microcontrollers, graphics processing units (GPUs), digital signal processors (DSPs), field programmable gate arrays (FPGAs), application specific integrated circuits (ASICs), or the like.

The support circuits 304 comprise well-known circuits and devices that support the functionality of the CPU 302. The support circuits 304 may comprise, but are not limited to, clock circuits, communications circuits, cache memory, power supplies, and the like.

Memory 306 is an example of non-transitory computer readable media capable of storing instructions which, when executed by the CPU 302, cause the computer 300 to perform any one or more of the operations described herein. The memory 306 can store an operating system and one or more software applications, instructions, programs, and/or data to implement the methods described herein and the functions attributed to the various systems. In various implementations, the memory 306 can be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein. Additionally, or alternatively, the memory 306 is capable of storing images 312, compressed or downsampled image data, output of one or more images 312 or other data.

The memory 306 may store various programs, sub-programs, sub-routines and data such as, for example, but not limited to, software to implement the dual-pol prescreener 308 and change detector 310. The computer 300, when executing the dual-pol prescreener 308 and change detector 310, performs the image processing functions described with respect to FIG. 2. Specifically, the computer 300 operates as the MPMFPS change detection processor 200 in processing images 312 (e.g., reference and test images) to generate and store images 312 (e.g., prescreen reference, test and target images) as well as the detection list 314. One or more communication circuits within the support circuits 304 is used for receiving images 312 including the test and reference images that are processed by the computer 300.

Figure 4:
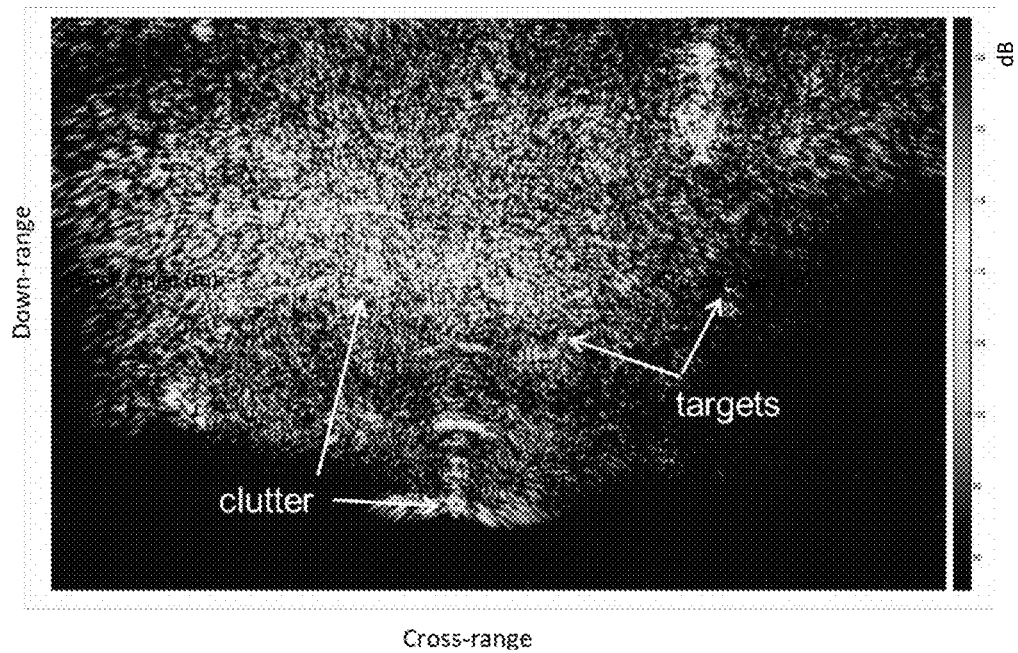
FIG. 4 depicts a co-pol SAR image of a scene showing locations of targets and symmetric clutter objects that may lead to false alarms.
Figure 5:
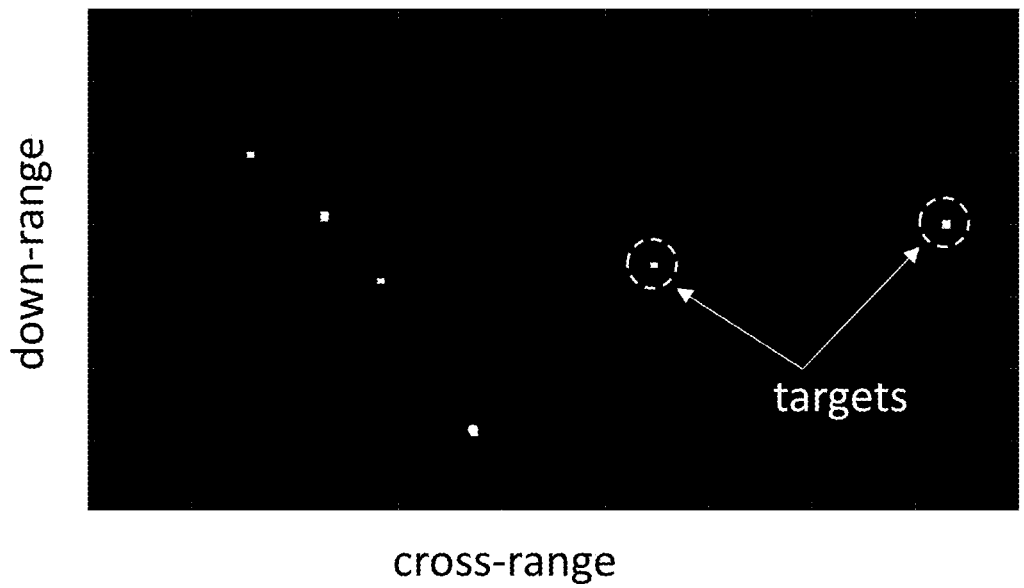
FIG. 5 depicts an output of the dual-pol, multi-feature prescreener showing target locations as well as a number of white "dots" that represent false alarm locations, i.e., locations of natural objects having left-right symmetry.

FIG. 4 depicts an exemplary co-pol SAR image of a scene showing the locations of targets and symmetric clutter objects that may lead to false alarms. FIG. 5 depicts an output of the dual-pol, multi-feature prescreener 206 of FIG. 2 showing target locations as well as a number of white "dots" that represent false alarm locations, i.e., locations of natural objects having left-right symmetry.

Figure 6:
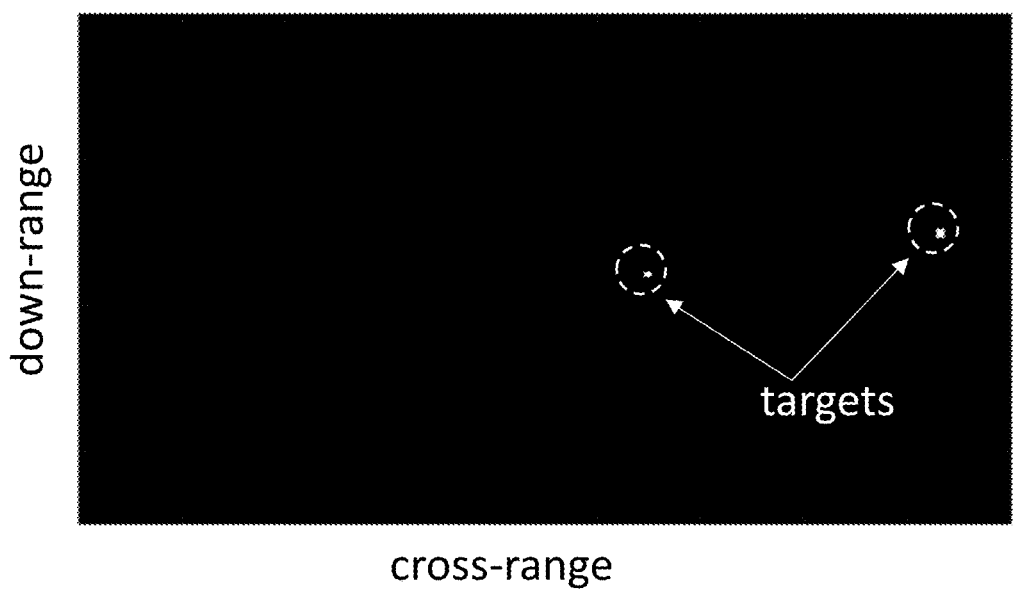
FIG. 6 depicts an example of a target image where false alarms have been removed by embodiments of the invention.

FIG. 6 depicts an example of a target image 214 output by the change detector 208 where the false alarms have been removed by embodiments of the invention such that the target image contains substantially only locations of target man-made objects (shown as located in the white circles for emphasis). Consequently, through application of the change detector 208 to the prescreened images, most, if not all, the false alarm objects are removed from the target image.

While the foregoing is directed to embodiments of the present invention, other and further embodiments of the invention may be devised without departing from the basic scope thereof, and the scope thereof is determined by the claims that follow.

The invention claimed is:

1. Apparatus configured to determine the location of man-made objects in synthetic aperture radar imagery, comprising:
   a prescreener configured to:
      receive a test image and an earlier-taken reference image of the same scene;
      analyze the reference image and the test image to determine symmetric objects in the reference image and the test image, and
      produce a prescreened reference image and a prescreened test image, each including only pixels of the locations of determined symmetric objects; and
   a change detector configured to:
      analyze the prescreened reference image and the prescreened test image to detect changes in the determined symmetric objects between the prescreened reference image and the prescreened test image, and
      output a target image including only the locations of determined symmetric objects which have changed between the prescreened reference image and the prescreened test image.

2. The apparatus of claim 1, further comprising:
   a receiver configured to receive radar signals comprising cross-polarized and co-polarized responses; and
   a processor configured to process the cross-polarized and co-polarized response to form the test image and the reference image.

3. The apparatus of claim 2, wherein the cross-polarized responses are created by transmitting a horizontally polarized signal and receiving a vertically polarized signal or transmitting a vertically polarized signal and receiving a horizontally polarized signal or both, and the co-polarized responses are created by transmitting a horizontally polarized signal and receiving a horizontally polarized signal or transmitting a vertically polarized signal and receiving a vertically polarized signal or both.

4. The apparatus of claim 1, wherein the reference image does not contain man-made objects and the test image contains man-made objects, the reference image does contains man-made objects and the test image does not contain man-made objects, or both the reference image and test image have man-made objects added and removed.

5. The apparatus of claim 1, wherein the prescreener is further configured to create a detection list of symmetric object locations in the test image, and the change detector is further configured to create an updated detection list of symmetric objects which have changed.

6. The apparatus of claim 5, wherein the change detector convolves a filter with the reference image at the locations identified in the detection list.

7. The apparatus of claim 6, wherein the convolution has the form:

$$F_{ref}(m_i,n_i)=\Sigma_{m,n \in T}I_{ref}(m_i+m,n_i+n)\text{Template}(m,n)$$

where $I_{ref}$ is the reference image at pixel location $m_i$ and $n_i$ and the filter is Template that is applied at location (m,n) defined by the detection list.

8. The apparatus of claim 7, wherein the change detector applies a ratio test having the form:

$$I_{CD}(m_i, n_i) = \frac{I_{test}(m_i, n_i)}{\max(F_{norm}(m_i, n_i), \text{floor})},$$

where a prescreened test image pixel value $I_{test}$ at the location $(m_i,n_i)$ forms a numerator of the ratio test and a denominator of the test ratio is the larger of a maximum value of the convolution output $F_{norm}(m_i,n_i)$ or a floor value, where $F_{norm}(m_i,n_i)$ is defined as:

$$F_{norm}(m_i, n_i) = \frac{\max\{F_{ref}(m_k, n_k)\}}{m_k, n_k \in R},$$

where R is the region over which a plurality of spatial averages are evaluated, the floor value is the smallest value allowed for the denominator, and $I_{CD}(m_i,n_i)$ is evaluated at regions centered at all locations, $(m_i,n_i)$, in the detection list.

9. A method configured to determine the location of man-made objects in synthetic aperture radar imagery comprising:
receiving a test image and an earlier-taken reference image of the same scene;
analyzing the reference image and the test image to determine symmetric objects in the reference image and the test image, and
producing a prescreened reference image and a prescreened test image, each including only pixels of the locations of determined symmetric objects; and
analyzing the prescreened reference image and the prescreened test image to detect changes in the determined symmetric objects between the prescreened reference image and the prescreened test image, and
outputting a target image including only the locations of determined symmetric objects which have changed between the prescreened reference image and the prescreened test image.

10. The method of claim 9, further comprising:
receiving radar signals comprising cross-polarized and co-polarized responses; and
processing the cross-polarized and co-polarized response to form a test image and a reference image.

11. The method of claim 10, wherein the cross-polarized responses are created by transmitting a horizontally polarized signal and receiving a vertically polarized signal or transmitting a vertically polarized signal and receiving a horizontally polarized signal or both, and the co-polarized responses are created by transmitting a horizontally polarized signal and receiving a horizontally polarized signal or transmitting a vertically polarized signal and receiving a vertically polarized signal or both.

12. The method of claim 9, wherein the reference image does not contain man-made objects and the test image contains man-made objects, the reference image does contains man-made objects and the test image does not contain man-made objects, or both the reference image and test image have man-made objects added and removed.

13. The method of claim 9, further comprising creating a detection list of symmetric object locations in the test image and creating an updated detection list of symmetric objects which have changed.

14. The method of claim 13, wherein changing detecting further comprises convolving a filter with the reference image at the locations identified in the detection list.

15. The method of claim 14, wherein the convolving has the form:

$$F_{ref}(m_i,n_i)=\Sigma_{m,n \in T}I_{ref}(m_i+m,n_i+n)\text{Template}(m,n),$$

where $I_{ref}$ is the reference image at pixel location $m_i$ and $n_i$ and the filter is Template that is applied at location (m,n) defined by the detection list.

16. The method of claim 15, wherein the change detecting further comprises applying a ratio test having the form:

$$I_{CD}(m_i, n_i) = \frac{I_{test}(m_i, n_i)}{\max(F_{norm}(m_i, n_i), \text{floor})},$$

where a prescreened test image pixel value $I_{test}$ at the location $(m_i,n_i)$ forms a numerator of the ratio test and a denominator of the test ratio is the larger of a maximum value of the convolution output $F_{norm}(m_i,n_i)$ or a floor value, where $F_{norm}(m_i,n_i)$ is defined as:

$$F_{norm}(m_i, n_i) = \frac{\max\{F_{ref}(m_k, n_k)\}}{m_k, n_k \in R},$$

where R is the region over which a plurality of spatial averages are evaluated, the floor value is the smallest value allowed for the denominator, and $I_{CD}(m_i,n_i)$ is evaluated at regions centered at all locations, $(m_i,n_i)$, in the detection list.

* * * * *